United States Patent
Yao

(10) Patent No.: US 11,354,520 B2
(45) Date of Patent: Jun. 7, 2022

(54) DATA PROCESSING METHOD AND APPARATUS PROVIDING TRANSLATION BASED ON ACOUSTIC MODEL, AND STORAGE MEDIUM

(71) Applicant: BEIJING SOGOU TECHNOLOGY DEVELOPMENT CO., LTD., Beijing (CN)

(72) Inventor: Guangchao Yao, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 149 days.

(21) Appl. No.: 16/698,750

(22) Filed: Nov. 27, 2019

(65) Prior Publication Data

US 2021/0089726 A1   Mar. 25, 2021

(30) Foreign Application Priority Data

Sep. 19, 2019   (CN) .......................... 201910889063.X

(51) Int. Cl.
*G06F 40/58* (2020.01)
*G10L 17/00* (2013.01)
*G10L 17/02* (2013.01)
*G10L 17/06* (2013.01)

(52) U.S. Cl.
CPC .............. *G06F 40/58* (2020.01); *G10L 17/00* (2013.01); *G10L 17/02* (2013.01); *G10L 17/06* (2013.01)

(58) Field of Classification Search
None
See application file for complete search history.

(56) References Cited

U.S. PATENT DOCUMENTS

| 7,693,719 | B2* | 4/2010 | Chu | G10L 13/033 704/270.1 |
| 7,987,244 | B1* | 7/2011 | Lewis | G10L 13/033 709/219 |
| 8,768,702 | B2* | 7/2014 | Mason | G10L 15/22 704/258 |
| 9,922,641 | B1* | 3/2018 | Chun | G10L 15/063 |
| 10,216,729 | B2* | 2/2019 | Kim | H04M 1/6041 |
| 11,094,311 | B2* | 8/2021 | Candelore | G10L 13/047 |
| 2005/0256716 | A1* | 11/2005 | Bangalore | G10L 13/033 704/260 |
| 2010/0036653 | A1* | 2/2010 | Kim | G06F 40/58 704/3 |

(Continued)

*Primary Examiner* — Douglas Godbold
(74) *Attorney, Agent, or Firm* — Anova Law Group, PLLC

(57) ABSTRACT

In present disclosure, a data processing method, a data processing device, and an apparatus for data processing are provided. The method specifically includes: receiving a source language speech input by a target user; determining, based on the source language speech, a target acoustic model from a preset acoustic model library, the acoustic model library including at least two acoustic models corresponding to different timbre characteristics; converting, based on the target acoustic model, the source language speech into a target language speech; and outputting the target language speech. According to the embodiments of the present disclosure, the recognition degree of the speaker corresponding to the target language speech output by the translation device can be increased, and the effect of user communication can be improved.

18 Claims, 4 Drawing Sheets

(56) References Cited

U.S. PATENT DOCUMENTS

| | | | |
|---|---|---|---|
| 2011/0238407 A1* | 9/2011 | Kent | G06F 40/58 704/3 |
| 2011/0307241 A1* | 12/2011 | Waibel | G10L 15/06 704/2 |
| 2012/0221321 A1* | 8/2012 | Nakamura | G10L 15/32 704/2 |
| 2012/0253811 A1* | 10/2012 | Breslin | G10L 17/00 704/249 |
| 2016/0372117 A1* | 12/2016 | Klose | G10L 15/22 |
| 2016/0379638 A1* | 12/2016 | Basye | G10L 15/18 704/235 |
| 2017/0286407 A1* | 10/2017 | Chochowski | G10L 15/26 |
| 2020/0012724 A1* | 1/2020 | Kawatake | G10L 15/005 |
| 2020/0111474 A1* | 4/2020 | Kumar | G10L 15/07 |
| 2020/0134026 A1* | 4/2020 | Lovitt | H04R 3/005 |
| 2020/0349950 A1* | 11/2020 | Yoshioka | G10L 15/083 |

* cited by examiner

DATA PROCESSING METHOD AND APPARATUS PROVIDING TRANSLATION BASED ON ACOUSTIC MODEL, AND STORAGE MEDIUM

CROSS-REFERENCE TO RELATED APPLICATION

This application claims the priority to Chinese Patent Application No. 201910889063.X, entitled "Data Processing Method, Device and Apparatus for Data Processing," filed on Sep. 19, 2019, the entire content of which is incorporated herein by reference.

TECHNICAL FIELD

The present disclosure relates to the field of computer technologies, and in particular relates to a data processing method, device, and an apparatus for data processing.

BACKGROUND

In daily life, oftentimes, users who speak different languages need to communicate with each other. If the two users of the communication do not understand the language of each other, they can achieve normal communication through a translation device.

Specifically, the translation device can receive the speech of the user, perform speech recognition on the received speech, convert the received speech into source language text, then translate the source language text to obtain target language text, and finally synthesize the target language text into a speech and broadcast the speech.

However, in the translation process, the translation device usually synthesizes the target language text in a fixed timbre/tone for broadcasting; that is, during the communication process when different users use the same translation device, the translation device converts the speeches of different users to voices having the same timbre. As such, in the process of communication, it is difficult for the users to recognize different speakers, not only affecting the user experience, but also affecting the user communication effect.

SUMMARY

In one aspect of the present disclosure, a data processing method is provided. The data processing method includes: receiving source language speech input by the target user; determining, based on the source language speech, a target acoustic model from an acoustic model library, the acoustic model library including at least two acoustic models corresponding to different timbre characteristics; converting the source language speech into a target language speech based on the target acoustic model; and outputting the target language speech.

In some embodiments, determining, based on the source language speech, a target acoustic model from the acoustic model library includes: performing voiceprint recognition to the source language speech input by the target user and determining one or more voiceprint characteristics corresponding to the source language speech; determining, based on the one or more voiceprint characteristics, a user identity of the target user; and determining a target acoustic model corresponding to the user identity from an acoustic model library.

In some embodiments, determining the target acoustic model corresponding to the user identity from an acoustic model library includes: determining, based on a user identity of the target user, a first target acoustic model from an acoustic model library, one or more timbre characteristics of the first target acoustic model matching default timbre characteristics of the target user.

In some embodiments, after the determining the first target acoustic model from the acoustic model library, the data processing method further includes: modifying, based on one or more current timbre characteristics of the target user, the first target acoustic model, to obtain a modified first target acoustic model, one or more timbre characteristics of the modified first target acoustic model matching the one or more current timbre characteristics of the target user; and converting, based on the target acoustic model, the source language speech into a target language speech, including converting, based on the modified first target acoustic model, the source language speech into a target language speech.

In some embodiments, determining a target acoustic model corresponding to the user identity from an acoustic model library includes: determining one or more timbre preferences of the target user based on a user identity of the target user; and determining, based on the one or more timbre preferences, a second target acoustic model from the acoustic model library, one or more timbre characteristics of the second target acoustic model matching the one or more timbre preferences of the target user.

In some embodiments, the data processing method further includes: collecting user's voice data; classifying the collected voice data based on one or more voiceprint characteristics to obtain one or more voice data sets corresponding to one or more voiceprint characteristics of different users; using the voice data in a voice data set as a training sample to obtain an acoustic model corresponding to each voiceprint characteristic by training, the acoustic model corresponding to different voiceprint characteristics including different timbre characteristics; and establishing the acoustic model library based on the acoustic model corresponding to each voiceprint characteristic.

In some embodiments, the data processing method further includes: saving a source language speech input by the target user to update a voice data set corresponding to the one or more voiceprint characteristics of the target user; and optimizing the acoustic model corresponding to the one or more voiceprint characteristics of the target user based on the updated voice data set corresponding to the one or more voiceprint characteristics of the target user.

According to another aspect of the present disclosure, a data processing device is provided. The data processing device includes: a speech receiving module, configured to receive a source language speech input by a target user; a model determining module, configured to determine a target acoustic model from an acoustic model library based on the source language speech, the acoustic model library including at least two acoustic models corresponding to different timbre characteristics; a speech converting module, configured to convert the source language speech into a target language speech based on the target acoustic model; and a speech outputting module, configured to output the target language speech.

In some embodiments, the model determining module includes: a voiceprint recognition sub-module, configured to perform voiceprint recognition to a source language speech input by the target user and determine one or more voiceprint characteristics corresponding to the source language speech; an identity determining sub-module, configured to determine a user identity of the target user based on the one or more voiceprint characteristics; and a model determining sub-module, configured to determine a target acoustic model corresponding to the user identity from an acoustic model library.

In some embodiments, the model determining module is configured to determine, based on a user identity of the target user, a first target acoustic model from an acoustic model library. One or more timbre characteristics of the first target acoustic model match one or more default timbre characteristics of the target user.

In some embodiments, the data processing device further includes: a model correction module, configured to modify the first target acoustic model based on one or more current timbre characteristics of the target user, to obtain a modified first target acoustic model; one or more timbre characteristics of the modified first target acoustic model matching the one or more current timbre characteristics of the target user; and a speech converting module, specifically configured to convert the source language speech into a target language speech based on the modified first target acoustic model.

In some embodiments, the model determining module is configured to: determine one or more timbre preferences of the target user based on a user identity of the target user; and based on the one or more timbre preferences, determine a second target acoustic model from the acoustic model library, one or more timbre characteristics of the second target acoustic model matching the one or more timbre preferences of the target user.

In some embodiments, the data processing device further includes: a data collection module, configured to collect user voice data; a data classifying module, configured to classify the collected voice data based on one or more voiceprint characteristics, to obtain one or more voice data sets corresponding to one or more voiceprint characteristics of different users; a model training module, configured to use the voice data in a voice data set as a training sample, to obtain an acoustic model corresponding to each voiceprint characteristic by training, the acoustic model corresponding to different voiceprint characteristics including different timbre characteristics; and a model library establishing module, configured to establish the acoustic model library based on the acoustic model corresponding to each voiceprint characteristic.

In some embodiments, the data processing device further includes: a data saving module, configured to save the source language speech input by the target user, to update the voice data set corresponding to the one or more voiceprint characteristics of the target user; and a model optimization module, configured to optimize the acoustic model corresponding to the one or more voiceprint characteristics of the target user based on the updated voice data set corresponding to the one or more voiceprint characteristics of the target user.

According to further aspect of the present disclosure, an apparatus for data processing is provided. The apparatus includes: a memory, and one or more programs stored in the memory and configured to be executed by one or more processors, the one or more processors executing instructions from the one or more programs for: receiving source language speech input by the target user; determining, based on the source language speech, a target acoustic model from an acoustic model library, the acoustic model library including at least two acoustic models corresponding to different timbre characteristics; converting the source language speech into a target language speech based on the target acoustic model; and outputting the target language speech.

In some embodiments, determining the target acoustic model from the acoustic model library based on the source language speech includes: performing voiceprint recognition to the source language speech input by the target user, and determining one or more voiceprint characteristics corresponding to the source language speech; determining a user identity of the target user based on the one or more voiceprint characteristics; and determining a target acoustic model corresponding to the user identity from the acoustic model library.

In some embodiments, determining a target acoustic model corresponding to the user identity from an acoustic model library includes: determining, based on a user identity of the target user, a first target acoustic model from an acoustic model library, one or more timbre characteristics of the first target acoustic model matching one or more default timbre characteristics of the target user.

In some embodiments, the apparatus for data processing is further configured to execute, by the one or more processors, the one or more programs to include instructions for: modifying the first target acoustic model based on one or more current timbre characteristics of the target user to obtain a modified first target acoustic model, one or more timbre characteristics of the modified first target acoustic model matching the one or more current timbre characteristics of the target user; converting, based on the target acoustic model, the source language speech into a target language speech, including converting, based on the modified first target acoustic model, the source language speech into a target language speech.

In some embodiments, determining the target acoustic model corresponding to the user identity from the acoustic model library includes: determining, based on the user identity of the target user, one or more timbre preferences of the target user; and determining, based on the one or more timbre preferences, a second target acoustic model from the acoustic model library, one or more timbre characteristics of the second target acoustic model matching the one or more timbre preferences of the target user.

In some embodiments, the apparatus is further configured to execute, by the one or more processors, the one or more programs to include instructions for: collecting user's voice data; classifying the collected voice data based on the one or more voiceprint characteristics to obtain voice data sets corresponding to the one or more voiceprint characteristics of different users; using the voice data in the voice data set as a training sample to obtain an acoustic model corresponding to each voiceprint characteristic by training, the acoustic model corresponding to different voiceprint characteristics including different timbre characteristics; and establishing the acoustic model library based on the acoustic model corresponding to each voiceprint characteristic.

In some embodiments, the apparatus is further configured to execute, by the one or more processors, the one or more programs to include instructions for: saving a source language speech input by the target user to update the voice data set corresponding to the one or more voiceprint characteristics of the target user; and optimizing the acoustic model corresponding to the one or more voiceprint characteristics of the target user based on the updated voice data set corresponding to the one or more voiceprint characteristics of the target user.

According to another aspect of the present disclosure, a machine-readable medium is provided. The machine-readable medium stores instructions, and when executed by one or more processors, causes a data processing device to perform a data processing method, including: receiving source language speech input by the target user; determining, based on the source language speech, a target acoustic model from an acoustic model library, the acoustic model library including at least two acoustic models corresponding to different timbre characteristics; converting the source language speech into a target language speech based on the target acoustic model; and outputting the target language speech.

BRIEF DESCRIPTION OF THE DRAWINGS

In order to more clearly illustrate the technical solutions of the embodiments of the present disclosure, the drawings used in the description of the embodiments of the present disclosure will be briefly described below. It is obvious that the drawings in the following description are only some embodiments of the present disclosure. Other drawings may also be obtained from those of ordinary skill in the art based on these drawings without the inventive efforts.

DETAILED DESCRIPTION OF THE EMBODIMENTS

The technical solutions in the embodiments of the present disclosure are clearly and completely described in the following with reference to the accompanying drawings in the embodiments of the present disclosure. It is obvious that the described embodiments are a part of the embodiments of the present disclosure, but not all embodiments. All other embodiments obtained by those skilled in the art based on the embodiments of the present disclosure without creative efforts are within the scope of the present disclosure.

Method Embodiment

Figure 1:
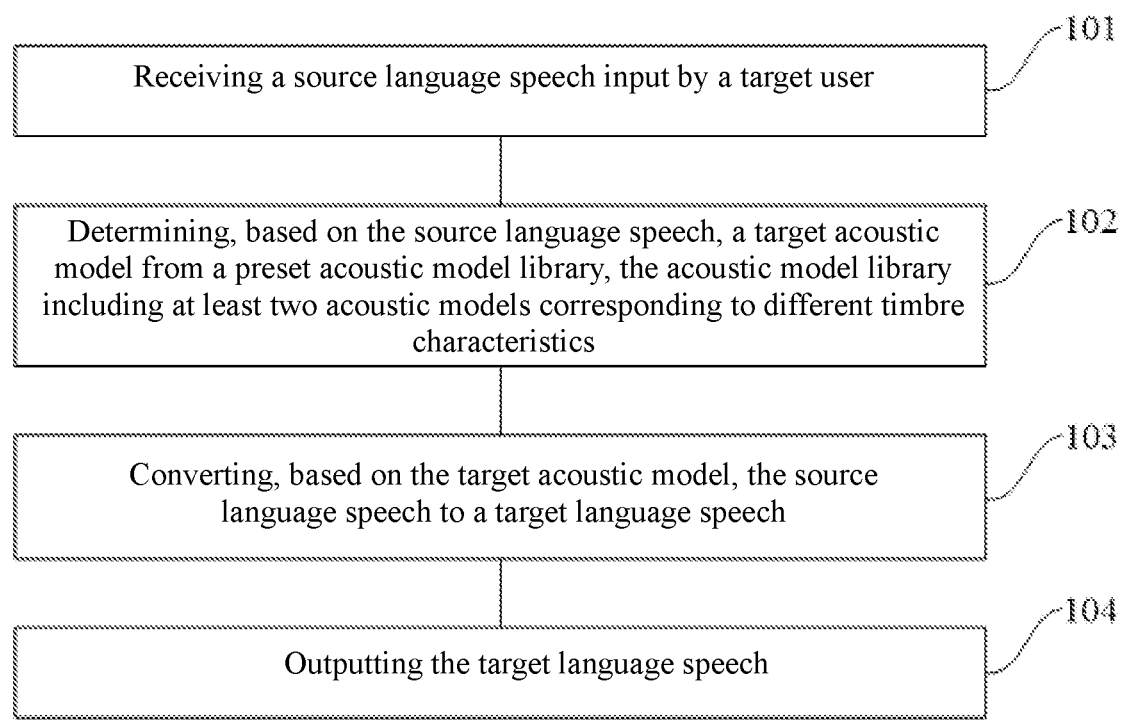
FIG. 1 is a flow chart showing the steps of a data processing method according to certain embodiments of the present disclosure.

Referring to FIG. 1, a flow chart of steps of an embodiment of a data processing method of the present disclosure is shown. The data processing method may specifically include the following steps:

Step 101: Receiving a source language speech input by a target user.

Step 102: Determining, based on the source language speech, a target acoustic model from a preset acoustic model library. The acoustic model library includes at least two acoustic models corresponding to different timbre characteristics.

Step 103: Converting, based on the target acoustic model, the source language speech into a target language speech.

Step 104: Outputting the target language speech.

According to certain embodiments of the present disclosure, the data processing method may be applicable to a translation device, and the target user refers to a user who is currently inputting a source language speech to the translation device. The source language speech may be a speech recorded in real time by the translation device, or may also be a speech saved locally by the translation device, or may also be a speech downloaded from a network by the translation device or received through a network transmission.

The translation device can translate the source language speech into a target language speech that conforms to the timbre characteristics of the target acoustic model. Assuming that the source language is Chinese, and the target language is English, the translation device can receive a Chinese speech input by a user and output a translated English speech, and the English speech conforms to the timbre characteristics of the target acoustic model. Of course, the embodiment of the present disclosure does not limit the source language and the type of the target language.

Specifically, after receiving the source language speech input by the target user, the translation device may determine, based on the source language speech, the target acoustic model from the preset acoustic model library.

The acoustic model library may include at least two acoustic models corresponding to different timbre characteristics. Timbre can used to describe frequencies of different sounds having distinguished characteristics in waveforms. Timbre can be understood as a characteristic of sound, and since each person's timbres are different, each person has a different voice.

According to certain embodiments of the present disclosure, at least two acoustic models in the acoustic model library may correspond to timbre characteristics of different user voices. The timbre characteristics of the target acoustic model may be the same as the timbre characteristics of the source language speech; that is, after the translation device receives the source language speech input by the target user, the target language voice may be output according to the voice of the target user. Alternatively, the timbre characteristics of the target acoustic model may also be inconsistent with the timbre characteristics of the source language speech, for example, the timbre characteristics of the target acoustic model may be timbre characteristics of a preset sound by the target user, or timbre characteristics preferred by the target user, etc.

The specific process of converting, based on the target acoustic model, the source language speech into the target language speech may be as follows: First, performing speech recognition processing on the source language speech input by the target user to obtain the source language text; then, translating the source language text to obtain a target language text; next, determining, based on the source language speech, a target acoustic model from the preset acoustic model library; finally, based on the target acoustic model, synthesizing the target language text to obtain the target language speech.

Since the acoustic model library includes at least two acoustic models corresponding to different timbre characteristics, the translation device can determine different target acoustic models based on the source language speech input by different target users; and different target acoustic models have different timbre characteristics, accordingly, a recognition degree of the speaker corresponding to the target language voice output by the translation device can be increased, to enhance a user communication effect.

It is to be understood that the embodiment of the present disclosure does not limit the specific form of the translation device, and the translation device may be a translation device, or the translation device may also be an electronic device with a translation function, and the electronic device includes but is not limited to: server, smartphone, tablet, e-book reader, MP3 (Moving Picture Experts Group Audio Layer III) player, MP4 (Moving Picture Experts Group Audio Layer IV) player, laptops, car computer, desktop computer, set top box, smart TV, wearable device, etc.

In an optional embodiment of the present disclosure, determining a target acoustic model from a preset acoustic model library based on the source language speech may specifically include:

Step S11: Performing a voiceprint recognition on the source language speech input by the target user, and determining voiceprint characteristics corresponding to the source language speech;

Step S12: Determining, based on the voiceprint characteristics, a user identity of the target user.

Step S13: Determining a target acoustic model corresponding to the user identity from a preset acoustic model library.

In the embodiment of the present disclosure, at least two acoustic models corresponding to the user's identity may be established in advance, and a preset acoustic model library may be established based on the established acoustic model and the correspondent relationship between the acoustic model and the user identity. In the preset acoustic model library, different acoustic models correspond to different user identities, and acoustic models corresponding to different user identities have different timbre characteristics.

In specific applications, since the voices of different users have different voiceprint characteristics, the embodiment of the present disclosure can identify the user identity by the voiceprint characteristics of the user.

As such, after the translation device receives the source language speech input by the target user, the voiceprint recognition may be performed on the source language speech, and voiceprint characteristics corresponding to the source language speech may be determined, and then based on the voiceprint characteristics, the target acoustic model corresponding to the voiceprint characteristics is determined from the acoustic model library.

In practical applications, after inputting the source language speech, some users may need to maintain their own voice in the target language output by the translation device; while some users may, after inputting the source language speech, need the translation device to output the target language voice in a voice he/she likes, for example, a voice of a star/celebrity. In order to meet the diverse needs of different users, embodiments of the present disclosure may provide the following two options for acquiring a target acoustic model.

Option One

In the first option, after the translation device receives the source language speech of the target user, the output target language speech matches the timbre characteristics of the source language speech. In an optional embodiment of the present disclosure, determining a target acoustic model corresponding to the user identity from a preset acoustic model library may include:

Determining, based on the user identity of the target user, a first target acoustic model from a preset acoustic model library. Timbre characteristics of the first target acoustic model match preset timbre characteristics of the target user.

The preset timbre characteristics refers to timbre characteristics of a user's normal pronunciation/voice. According to certain embodiments of the present disclosure, the voice data of different users may be collected, and an acoustic model corresponding to each user's identity may be established according to the voice data of each user, and accordingly, the acoustic model library may be established based on the correspondences between user identities and acoustic models.

As such, after the translation device receives the source language speech input by the target user, voiceprint recognition may be performed on the source language speech, and the voiceprint characteristics corresponding to the source language speech may be determined, and accordingly, the user identity may be determined based on the voiceprint characteristics and a first target acoustic model corresponding to the user identity may be determined from the preset acoustic model library.

Since the first target acoustic model is established according to the voice data of the target user, timbre characteristics of the first target acoustic model matches the preset timbre characteristics of the target user. Based on the first target acoustic model, the source language speech can be converted into the target language speech that matches the target user's preset timbre characteristics; that is, the target user's voice can remain unchanged.

In an optional embodiment of the present disclosure, after determining the first target acoustic model from the preset acoustic model library, the method may further include modifying the first target acoustic model based on the current timbre characteristics of the target user to obtain a modified first target acoustic model. Timbre characteristics of the modified first target acoustic model match the target user's current timbre characteristics.

Based on the target acoustic model, converting the source language speech into the target language speech may specifically include converting the source language speech into a target language speech based on the modified first target acoustic model.

In practical applications, the timbre characteristics of a user may change due to changes of the user's own state or an external environment. For example, when the user is subject to a cold, the user may have different timbre characteristics from the preset timbre characteristics that establishes the user's first target acoustic model. Therefore, according to certain embodiments of the present disclosure, after determining the first target acoustic model from the preset acoustic model library, the first target acoustic model may be further modified based on the current timbre characteristics of the target user, thereby obtaining the modified first target acoustic model that matches the user's current timbre characteristics, and further, based on the modified first target acoustic model, converting the source language speech currently input by the user into the target language speech. Accordingly, the target language speech output by the translation device can be automatically adjusted with the changes of the user's timber characteristics, to be consistent with the user's current timbre characteristics.

According to certain embodiments of the present disclosure, voice data of different users can be collected to build the acoustic model library. In an optional embodiment of the present disclosure, the method may further include:

Step S21: Collecting voice data of users;

Step S22: Classifying the collected voice data based on the voiceprint characteristics, and obtaining voice data sets corresponding to the voiceprint characteristics of different users;

Step S23: Using the voice data in the voice data sets as training samples, and obtaining acoustic models corresponding to characteristics of each voiceprint by training. The acoustic models corresponding to different voiceprint characteristics include different timbre characteristics.

Step S24: Establishing the preset acoustic model library based on the acoustic models corresponding to characteristics of each voiceprint.

According to certain embodiments of the present disclosure, each acoustic model in the acoustic model library corresponds to timbre characteristics of a different user's voice. Accordingly, in certain embodiments of the present disclosure, voice data of different users may be first collected. Of course, the embodiments of the present disclosure do limit the specific manner of collecting voice data of different users.

For example, the voice data of different users may be recorded in advance, or the voice of data of different users may be acquired from network big data.

In certain embodiments of the present disclosure, since a same translation device may be used by a plurality of users, source language speeches input by different users can be saved in the process of using the translation device by a user, and the saved source language speeches may be used as collected voice data of different users.

Accordingly, in certain embodiments of the present disclosure, the acoustic models of different users can be established without the user's perception. Specifically, when the acoustic model of a user is not established, the translation device can provide a default acoustic model having default timbre characteristics, and the translation device can output the target language speech having default timbre characteristics when the user uses the translation device.

Specifically, when receiving the source language speech input by the user, the translation device may perform voiceprint recognition on the currently received source language speech to obtain current voiceprint characteristics, and then may save the currently received source language speech in the voice data set corresponding to the current voiceprint characteristics. Accordingly, the voice data of different voiceprint characteristics can be divided into different voice data sets, so that the collected voice data can be classified based on the voiceprint characteristics, to obtain the voice data sets corresponding to the voiceprint characteristics of different users, and different acoustic models corresponding to different voiceprint characteristics correspond to the timbre characteristics of voices of different users.

Optionally, in certain embodiments of the present disclosure, the collected voice data set may be saved locally in the translation device. In certain embodiments, since the training process of the acoustic model requires a large number of calculations, when the translation is connected to a network, local voice data set may be uploaded to a server, to obtain acoustic models of different users by training at the server.

The translation device can download the acoustic models of different users in the server to the local to implement offline speech synthesis, or can also implement online speech synthesis directly through the acoustic model in the server.

In the process of translating the source language speech input by the user using the default acoustic model, the translation device continuously collects the voice data of different users, and when the voice data in the voice data set of a certain user is accumulated to satisfy the condition of a trained acoustic model, the voice data in the voice data set can be used as a training sample, to obtain an acoustic model corresponding to the voice data set by training.

It should be noted that the embodiment of the present disclosure does not limit the specific types of the acoustic model, and the acoustic model may be a neural network model. The neural network model may include a plurality of neural networks, and the neural network includes but is not limited to at least one of the following, or a combination, superimposition, or nesting of at least two of: CNN (Convolutional Neural Network), LSTM (Long Short-Term Memory) network, RNN (Simple Recurrent Neural Network), attention neural network, etc.

It can be understood that the training method of the acoustic model is not limited to the embodiments of the present disclosure. For example, the voice data of a user may be collected, and the voice data of the user may be used as a training sample, to obtain the acoustic model of the user by training. Alternatively, in the process of collecting the voice data of the user, the text information corresponding to the voice data may be saved, and the voice data of the user and the text information corresponding to the voice data may be used as training samples, to obtain the acoustic model of the user by training.

In an optional embodiment of the present disclosure, determining a target acoustic model from a preset acoustic model library based on the source language speech may include: determining, based on the voiceprint characteristics of the source language speech, whether an acoustic model corresponding to the voiceprint characteristics of the source language speech is present in a preset acoustic model library; and if present, an acoustic model of the user has been established in the acoustic model library, then the obtained acoustic model may be used as the target acoustic model.

According to certain embodiments of the present disclosure, after receiving the source language speech input by the target user, the translation device may extract the voiceprint characteristics of the source language speech, and search in the preset acoustic model library for whether the acoustic model corresponding to the voiceprint characteristics of the source language speech is present; if present, it is indicated that the acoustic model of the target user has been established in the preset acoustic model library, and the obtained acoustic model can be used as the target acoustic model.

If no acoustic model corresponding to the voiceprint characteristics of the source language speech exists in the preset acoustic model library, it is indicated that the acoustic model of the target user has not been established in the preset acoustic model library, then the default acoustic model may be used to synthesize the target language speech and the current target language speech may be saved in the voice data sets corresponding to the voiceprint characteristics of the target user to accumulate the voice data of the target user.

After the voice data in the voice data set corresponding to the voiceprint characteristics of the target user is accumulated to a certain extent, the acoustic model of the target user may be established based on the voice data in the voice data set, so that the target user is using the translation device again, the acoustic model of the target user can be used to synthesize the target language such that the target language speech conforms to the timbre characteristics of the target user's voice.

In an optional embodiment of the present disclosure, the method may further include:

Step S31: Saving the source language speech input by the target user to update the voice data set corresponding to the voiceprint characteristics of the target user.

Step S32: Based on the updated voice data set corresponding to the voiceprint characteristics of the target user, performing an optimization process to the acoustic model corresponding to the voiceprint characteristics of the target user.

If the acoustic model of the target user has been established in the preset acoustic model library, the translation device may also save the source language speech input by the target user to update the voice data set corresponding to the voiceprint characteristics of the target user, and to further perform an optimization processing to the acoustic model corresponding to the voiceprint characteristics of the target user, based on the updated voice data corresponding to the voiceprint characteristics of the target user.

Specifically, the updated voice data in the voice data set corresponding to the voiceprint characteristics of the target user may be used as a training sample, and the acoustic model corresponding to the voiceprint characteristics of the target user may be optimized, so that timbre characteristics of the optimized acoustic model are closer to the timbre characteristics of the target user.

Accordingly, when the user first uses the translation device, the target language voice output by the translation device conforms to the default timbre characteristics, but in the process of continuously using the translation device, the translation device can gradually accumulate the user's voice data, and establish an acoustic model of the user's voice. After establishing the user's acoustic model, the translation device can output the same target language voice as the source language speech voice. And as the user continues to use the translation device, the user's acoustic model can be continuously optimized so that the translation device outputs a target language voice of which the timber characteristics are closer to the user's timbre characteristics.

Option II

In an optional embodiment of the present disclosure, determining the target acoustic model corresponding to the user identity from the preset acoustic model library may include:

Step S41: Determining, based on the user identity of the target user, timbre preferences of the target user;

Step S42: Determining, based on the timbre preferences, a second target acoustic model from the preset acoustic model library. The timbre characteristics of the second target acoustic model matches the timbre preferences of the target user.

In certain embodiment of the present disclosure, after receiving the source language speech input by the target user, the translation device may output a target language voice that is inconsistent with the source language speech voice to increase the diversity and interest of the voice translation.

Specifically, the translation device may, based on the identity of the user of the target user, determine the timbre preferences of the target user. The timbre preferences may be obtained based on a user's presetting. The user can preset his own timbre preferences in advance, for example, set the timbre preferences as the timbre of a star or a popular Internet celebrity, or set the timbre preferences as the timbers of cartoon characters such as Crayon Shinchan and Cherry Maruko. Alternatively, in the embodiments of the present disclosure, the timbre preferences of the user may be obtained based on historical behavior data of the user.

According to certain embodiments of the present disclosure, based on the timbre preferences of the target user, a second target acoustic model of which the timbre characteristics matches the timbre preferences of the target user may be determined from the preset acoustic model library.

Accordingly, in the embodiments of the present disclosure, the translation device can output a target language speech that matches the timbre preference of the target user based on the timbre preferences of the target user, and the timbre characteristics of the target language speech can match the timbre characteristics of the target user. Alternatively, the timbre characteristics of the target language speech may not match the timbre characteristics of the target user, which may increase the diversity and interest of the speech translation.

In summary, according to certain embodiments of the present disclosure, after receiving the source language speech input by the target user, the translation device may determine the target acoustic model from the preset acoustic model library based on the source language speech; and further, based on the target acoustic model, convert the source language speech into a target language speech and output the target language speech. Since the acoustic model library includes at least two acoustic models corresponding to different timbre characteristics, the translation device can determine different target acoustic models based on the source language speech input by different target users, and different target acoustic models have different timbre characteristics, and thus, the recognition degree of the speaker corresponding to the target language speech output by the translation device may be increased, and the effect of the user communication may also be improved.

It should be noted that, for the method embodiments, for the sake of simple description, they are all expressed as a series of action combinations, but those skilled in the art should understand that the embodiments of the present disclosure are not limited by the described action sequence, because in accordance with the embodiments of the present disclosure, certain steps may be performed in other sequences or concurrently. In the following, those skilled in the art should also understand that the embodiments described in the specification are all preferred embodiments, and the actions involved are not necessarily required by the embodiments of the present disclosure.

Device Embodiment

Figure 2:
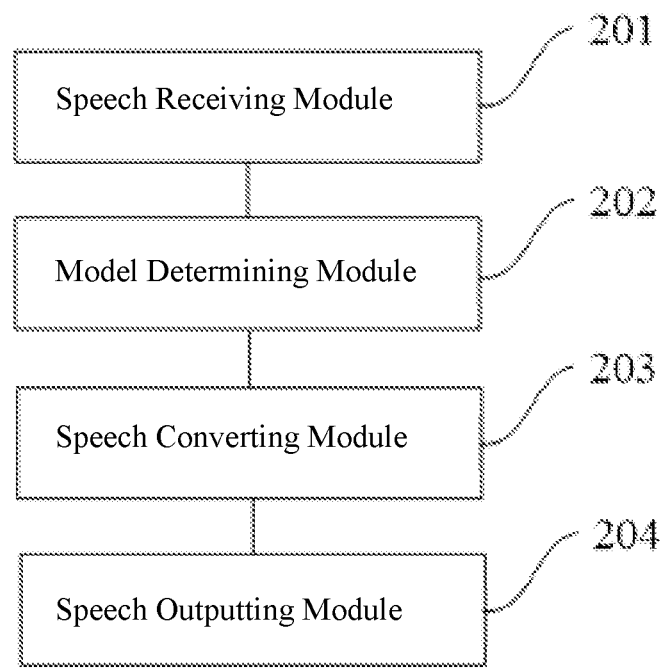
FIG. 2 is a block diagram showing the structure of a data processing apparatus according to certain embodiments of the present disclosure.

Referring to FIG. 2, in certain embodiments of the present disclosure, a structural block diagram of a data processing apparatus is shown. The apparatus may specifically include: a speech receiving module 201, configured to receive a source language speech input by a target user; a model determining module 202, configured to determine, based on the source language speech, a target acoustic model from a preset acoustic model library, the acoustic model library including at least two acoustic models corresponding to different timbre characteristics; a speech converting module 203, configured to convert the source language speech into a target language speech based on the target acoustic model; and a speech output module 204, configured to output the target language speech.

Optionally, the model determining module may include: a voiceprint recognition sub-module, configured to perform voiceprint recognition to a source language speech input by the target user, and determine voiceprint characteristics corresponding to the source language speech; an identity determining submodule, configured to determine a user identity of the target user based on the voiceprint characteristics; and a model determining sub-module, configured to determine a target acoustic model corresponding to the user identity from a preset acoustic model library.

Optionally, the model determining module may be configured to: determine, based on a user identity of the target user, a first target acoustic model from the preset acoustic model library. Timbre characteristics of the first target acoustic model matches preset timbre characteristics of the target user.

Optionally, the device may further include a model correction module, configured to modify the first target acoustic model based on current timbre characteristics of the target user, to obtain a modified first target acoustic model. Timbre characteristics of the modified first target acoustic model matches the current timbre characteristics of the target user;

The speech converting module is specifically configured to convert the source language speech into a target language speech based on the modified first target acoustic model.

Optionally, the model determining module is specifically configured to: determine timbre preferences of the target user based on a user identity of the target user; and determine, based on the timbre preferences, from the preset acoustic model library, a second acoustic model. Timbre characteristics of the second target acoustic model match the timbre preferences of the target user.

Optionally, the device may further include: a data collection module, configured to collect user voice data; a data dividing module, configured to classify the collected voice data based on voiceprint characteristics, to obtain voice data sets corresponding to voiceprint characteristics of different users; a model training module, configured to use the voice data in the voice data set as a training sample, to obtain an acoustic model corresponding to each voiceprint characteristic, the acoustic model corresponding to different voiceprint characteristics including different timbre characteristics; and a model library establishing module, configured to establish the preset acoustic model library based on the acoustic model corresponding to each voiceprint characteristic.

Optionally, the device may further include: a data saving module, configured to save a source language speech input by the target user, to update a voice data set corresponding to the voiceprint characteristics of the target user; and a model optimization module, configured to optimize an acoustic model corresponding to the voiceprint characteristics of the target user based on the updated voice data set corresponding to the voiceprint characteristics of the target user.

For the device embodiment, since it is basically similar to the method embodiment, the description is relatively simple, and the relevant parts can be referred to the description of the method embodiment.

The various embodiments in the present disclosure are described in a progressive manner, and each embodiment focuses on differences from other embodiments, and the same or similar parts between the various embodiments can be referred to each other.

With regard to the apparatus in the above embodiments, the specific manner in which the respective modules perform the operations has been described in detail in the embodiment relating to the method, and will not be explained in detail herein.

According to certain embodiments of the present disclosure, an apparatus for data processing is provided. The apparatus for data processing may include: a memory, and one or more programs stored in the memory and configured to be executed by one or more processors. The one or more programs include instructions for: receiving a source language speech input by a target user; determining a target acoustic model from a preset acoustic model library based on the source language speech, the acoustic model library including at least two acoustic models corresponding to different timbre characteristics; converting the source language speech into target language speech based on the target acoustic model; and outputting the target language speech.

Figure 3:
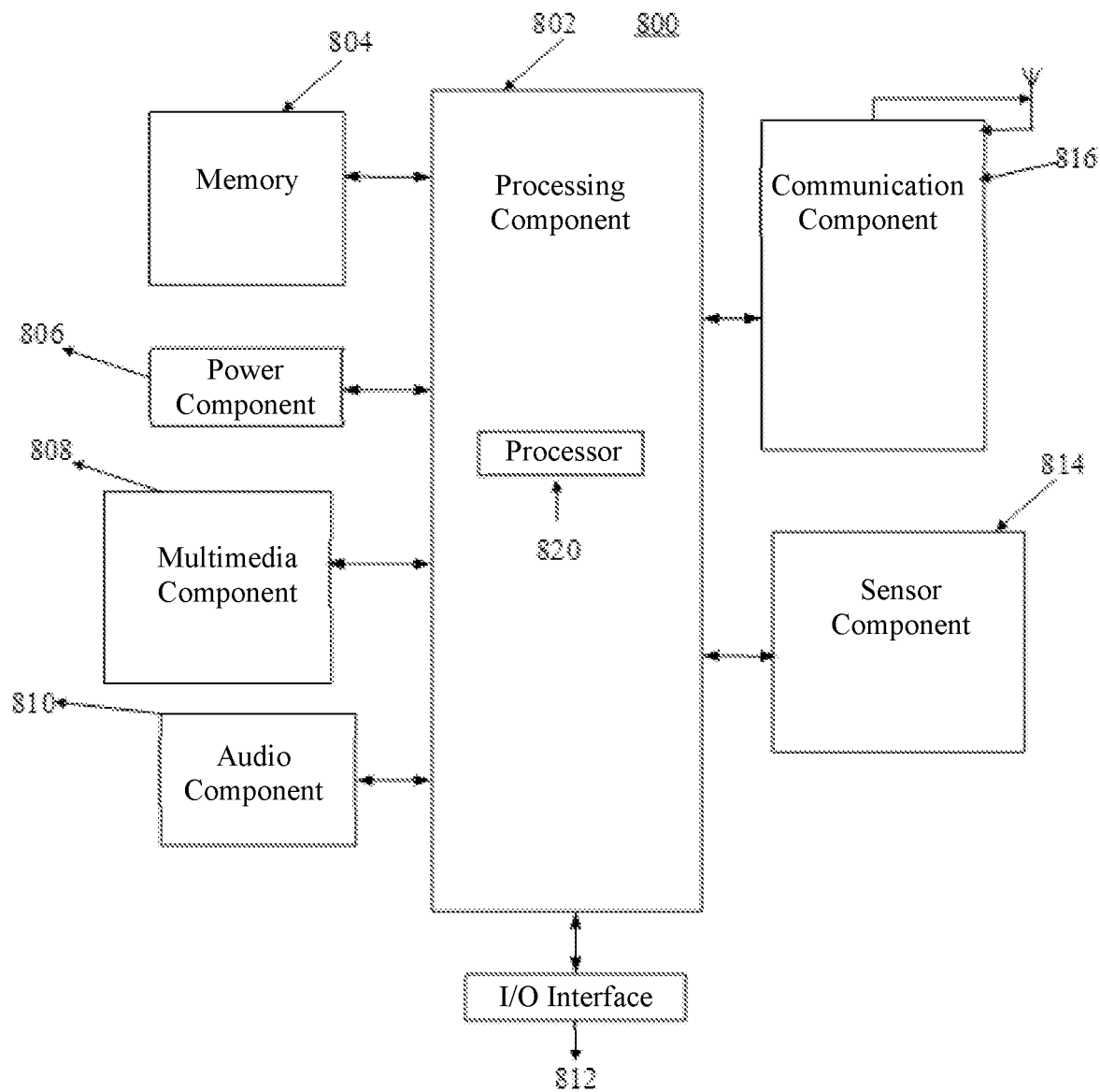
FIG. 3 is a block diagram of an apparatus for data processing according to certain embodiments of the present disclosure.

According to an exemplary embodiment, FIG. 3 is a block diagram of an apparatus 800 for data processing. For example, the apparatus 800 may be a mobile phone, a computer, a digital broadcast terminal, a messaging device, a gaming console, a tablet device, a medical device, a fitness device, a personal digital assistant, etc.

Referring to FIG. 3, the apparatus 800 may include one or more of the following components: processing component 802, memory 804, power component 806, multimedia component 808, audio component 810, input/output (I/O) interface 812, sensor component 814, and a communication component 816.

The processing component 802 typically controls an overall operation of the apparatus 800, such as operations associated with display, telephone calls, data communications, camera operations, and recording operations. The processing component 802 may include one or more processors 820 to execute instructions to perform all or part of the steps of the above-described methods. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support operations at the apparatus 800. Examples of such data include instructions for any application or method operated on the apparatus 800, contact data, phone book data, messages, pictures, videos, etc. The memory 804 can be implemented by any type of volatile or non-volatile storage device, or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 806 provides power to various components of the apparatus 800. The power component 806 may include a power management system, one or more power sources, and other components associated with generating, managing, and distributing power for the apparatus 800.

The multimedia component 808 includes a screen between the apparatus 800 and the user that provides an output interface. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touches or slides, but also the duration and pressure associated with the touches or slides. In some embodiments, the multimedia component 808 includes a front camera and/or a rear camera. When the apparatus 800 is in an operation mode, such as a shooting mode or a video mode, the front camera and/or the rear camera may receive external multimedia data. Each front camera or rear camera can be a fixed optical lens system or has focal length and optical zoom capabilities.

The audio component 810 is configured to output and/or input an audio signal. For example, the audio component 810 includes a microphone (MIC) that is configured to receive an external audio signal when the apparatus 800 is in an operational mode, such as a call mode, a recording mode, or a voice information processing mode. The received audio signal may be further stored in the memory 804 or transmitted via the communication component 816. In some embodiments, the audio component 810 also includes a speaker for outputting an audio signal.

The I/O interface 812 provides an interface between the processing component 802 and a peripheral interface module, which may be a keyboard, a click wheel, a button, etc. These buttons may include, but are not limited to, a home button, a volume button, a start button, and a lock button.

The sensor assembly 814 includes one or more sensors, configured to provide the apparatus 800 with a status assessment in various aspects. For example, the sensor assembly 814 can detect an open/closed state of the apparatus 800, a relative positioning of components such as display and keyboard of the apparatus 800; and sensor component 814 can also detect a change in position of one component of the apparatus 800 or the apparatus 800, the presence or absence of user contact with the apparatus 800, orientation or acceleration/deceleration of the apparatus 800, and temperature variations of the apparatus 800. The sensor assembly 814 may include a proximity sensor configured to detect the presence of nearby objects without any physical contact. The sensor assembly 814 may also include a light sensor such as a CMOS or CCD image sensor, for use in imaging applications. In some embodiments, the sensor assembly 814 may also include an acceleration sensor, a gyro sensor, a magnetic sensor, a pressure sensor, and a temperature sensor.

The communication component 816 is configured to facilitate wired or wireless communication between the apparatus 800 and other equipment. The apparatus 800 can access a wireless network based on a communication standard, such as WiFi, 2G or 3G, or a combination thereof. In some embodiments, communication component 816 receives broadcast signals or broadcast associated information from an external broadcast management system via a broadcast channel. In some embodiments, the communication component 816 also includes a near field communication (NFC) module to facilitate short range communication. For example, the NFC module can be implemented based on radio frequency information processing (RFID) technology, infrared data association (IrDA) technology, ultrawide band (UWB) technology, Bluetooth (BT) technology, and other technologies.

In certain embodiments, the apparatus 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above method.

In certain embodiments, a non-transitory computer readable storage medium including instructions is also provided. For example, the memory 804 including instructions executable by the processor 820 of the apparatus 800 to perform the above method. For example, the non-transitory computer readable storage medium may be a ROM, a random-access memory (RAM), a CD-ROM, a magnetic tape, a floppy disk, and an optical data storage device.

Figure 4:
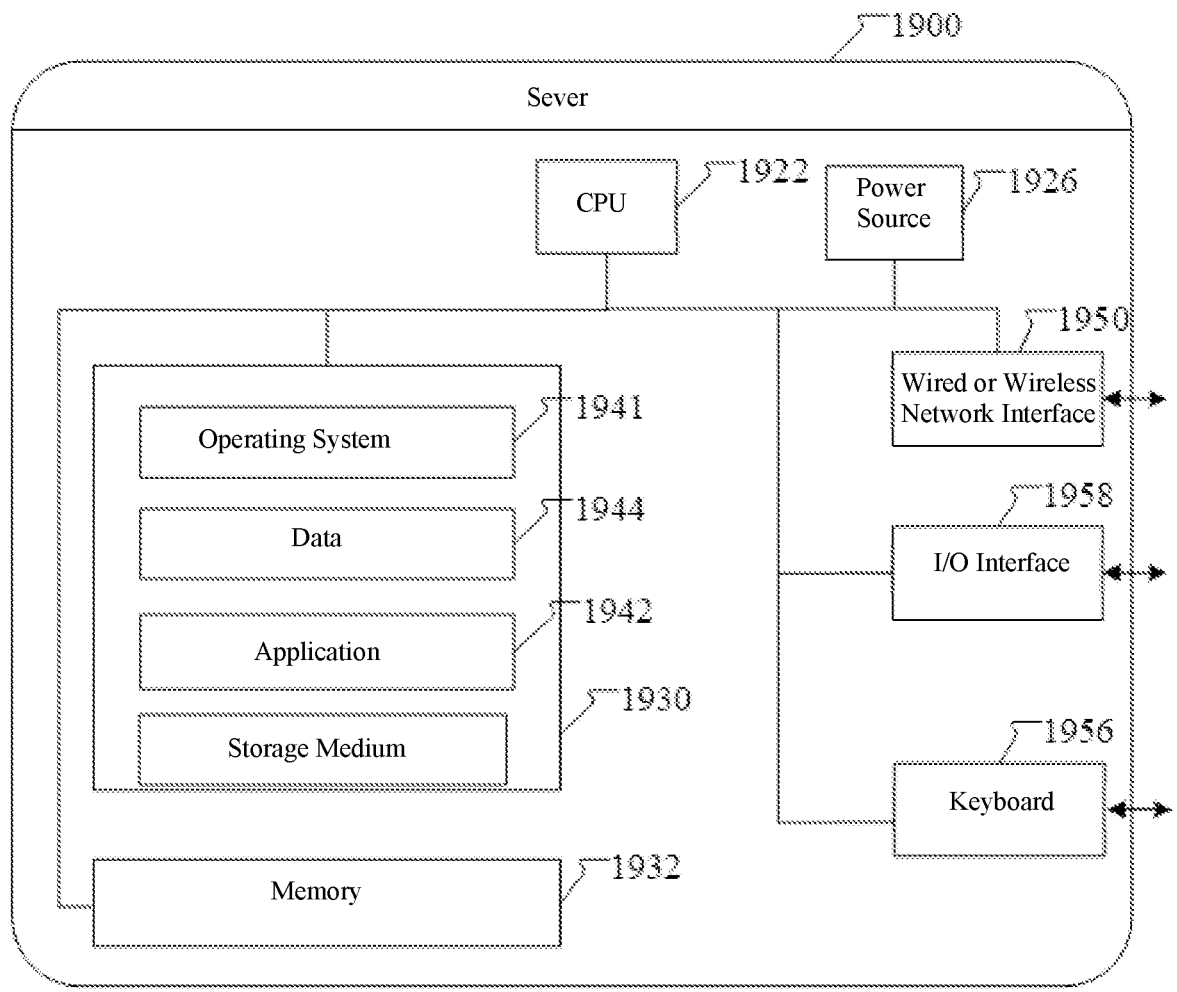
FIG. 4 is a schematic structural diagram of a server according to certain embodiments of the present disclosure.

According to certain embodiments of the present disclosure, FIG. 4 is a block diagram showing the structure of a server. The server 1900 may vary considerably depending on a configuration or performance, and may include one or more central processing units (CPUs) 1922 (e.g., one or more processors), a memory 1932, one or one applications 1942, one or more storage mediums 1930 of data 1944 (e.g., one or one mass storage devices). Among them, the memory 1932 and the storage medium 1930 may be temporary storage or persistent storage. Programs stored in the storage medium 1930 may include one or more modules (not shown), each of which may include a series of operation instructions to the server. Further, the central processing unit 1922 can be configured to communicate with the storage medium 1930, which performs a series of operation instructions to the storage medium 1930 in the server 1900.

The server 1900 may also include one or more power sources 1926, one or more wired or wireless network interfaces 1950, one or more input and output interfaces 1958, one or more keyboards 1956, and/or, one or more operating systems 1941 such as Windows Server™, Mac OS X™, Unix™, Linux™, FreeBSD™, etc.

In some embodiments of the non-transitory computer readable storage medium, when instructions in the storage medium are executed by a processor of a device (a server or a terminal), the device can perform the data processing method as illustrated in FIG. 1.

In some embodiments of the non-transitory computer readable storage medium, when instructions in the storage medium are executed by a processor of a device (a server or a terminal), the device can perform a data processing method. The method may include: receiving a target user input source language speech; determining, based on the source language speech, a target acoustic model from a preset acoustic model library, the acoustic model library including at least two acoustic models corresponding to different timbre characteristics; converting, based on the acoustic model, the source language speech into a target language speech; and outputting the target language speech.

According to certain embodiments of the present disclosure, a data processing method, A1, is disclosed. The data processing method may include: receiving source language speech input by the target user; determining, based on the source language speech, a target acoustic model from a preset acoustic model library, the acoustic model library including at least two acoustic models corresponding to different timbre characteristics; converting, based on the target acoustic model, the source language speech into a target language speech; and outputting the target language speech.

A2: Determining, based on the source language speech, a target acoustic model from a preset acoustic model library may include: performing voiceprint recognition to the source language speech input by the target user, and determining voiceprint characteristics corresponding to the source language speech; determining a user identity of the target user based on the voiceprint characteristics; and determining a target acoustic model corresponding to the user identity from a preset acoustic model library.

A3: Determining a target acoustic model corresponding to the user identity from a preset acoustic model library may include determining, based on the user identity of the target user, a first target acoustic model from a preset acoustic model library. Timbre characteristics of the first target acoustic model match preset timbre characteristics of the target user.

A4: After the determining the first target acoustic model from the preset acoustic model library, the method may further include modifying the first target acoustic model based on the current timbre characteristics of the target user, to obtain a modified first target acoustic model, the modified timbre characteristics of the first target acoustic model matching the current timbre characteristics of the target user; and converting, based on the target acoustic model, the source language speech into a target language speech may include converting, based on the modified first target acoustic model, the source language speech to a target language speech.

A5: Determining a target acoustic model corresponding to the user identity from a preset acoustic model library may include: determining, based on a user identity of the target user, timbre preferences of the target user; and determining, based on the timbre preference, a second target acoustic model from the preset acoustic model library. Timbre characteristics of the second target acoustic model match the timbre preferences of the target user.

A6: The data processing method, A1, may further include: collecting user's voice data; classifying, based on the voiceprint characteristics, the collected voice data, to obtain voice data sets corresponding to the voiceprint characteristics of different; using the voice data in the voice data set as a training sample, to obtain the acoustic model corresponding to each voiceprint characteristic by training, the acoustic model corresponding to different voiceprint characteristics including different timbre characteristics; and establishing, based on the acoustic model corresponding to each voiceprint characteristic, the preset acoustic model library.

A7: A6 may further include: saving a source language speech input by the target user to update a voice data set corresponding to the voiceprint characteristics of the target user; and optimizing, based on the updated voice data set corresponding to the voiceprint characteristics of the target user, the acoustic model corresponding to the voiceprint characteristics of the target user.

In certain embodiments of the present disclosure, a data processing device, B8, is provided. The data processing device, B8, may include: a speech receiving module, configured to receive a source language speech input by a target user; a model determining module, configured to determine a target acoustic model from a preset acoustic model library based on the source language speech, the acoustic model library including at least two acoustic models corresponding to different timbre characteristics; a speech converting module, configured to convert the source language speech into a target language speech based on the target acoustic model; and a voice output module, configured to output the target language speech.

B9: The model determining module may include: a voiceprint recognition sub-module, configured to perform voiceprint recognition to a source language speech input by the target user and determine voiceprint characteristics corresponding to the source language speech; an identity determining submodule, configured to determine a user identity of the target user based on the voiceprint characteristics; and a model determining sub-module, configured to determine a target acoustic model corresponding to the user identity from a preset acoustic model library.

B10: The model determining module is configured to determine, based on a user identity of the target user, a first target acoustic model from a preset acoustic model library. Timbre characteristics of the first target acoustic model match preset timbre characteristics of the target user.

B11: The data processing device may further include: a model modification module, configured to modify the first target acoustic model based on the current timbre characteristics of the target user, to obtain a modified first target acoustic model. The timbre characteristics of the modified first target acoustic model match the current timbre characteristics of the target user.

The speech converting module is specifically configured to convert the source language speech into a target language speech based on the modified first target acoustic model.

B12: The model determining module is configured to determine timbre preferences of the target user based on the user identity of the target user and determine, based on the timbre preferences, a second target acoustic model from the preset acoustic model library. Timbre characteristics of the second target acoustic model match the timbre preferences of the target user.

B13: The data processing device may further include: a data collection module, configured to collect user voice data; a data dividing module, configured to classify the collected voice data based on voiceprint characteristics and obtain voice data sets corresponding to the voiceprint characteristics of different users; a model training module, configured to use the voice data in the voice data set as a training sample and obtain an acoustic model corresponding to each voiceprint characteristic, the acoustic model corresponding to different voiceprint characteristics including different timbre characteristics; and a model library establishing module, configured to establish the preset acoustic model library based on the acoustic model corresponding to each voiceprint characteristic.

B14: The data processing device may further include: a data saving module, configured to save a source language speech input by the target user to update a voice data set corresponding to the voiceprint characteristics of the target user; and a model optimization module, configured to optimize an acoustic model corresponding to the voiceprint characteristics of the target user based on the updated voice data set corresponding to the voiceprint characteristics of the target user.

In certain embodiments of the present disclosure, an apparatus for data processing, C15, is provided. The apparatus for data processing, C15, may include: a memory, and one or more programs, and the one or more programs are stored in a memory and configured to be processed by one or more processors which execute the instructions from the one or more programs including those for performing the following operations: receiving source language speech input by the target user; determining, based on the source language speech, a target acoustic model from a preset acoustic model library, the acoustic model library including at least two acoustic models corresponding to different timbre characteristics; converting the source language speech into a target language speech based on the target acoustic model; and outputting the target language speech.

C16: Determining a target acoustic model from a preset acoustic model library based on the source language speech may include: performing voiceprint recognition on the source language speech input by the target user, and determining voiceprint characteristics corresponding to the source language speech; determining a user identity of the target user based on the voiceprint characteristics; and determining a target acoustic model corresponding to the user identity from a preset acoustic model library.

C17: Determining the target acoustic model corresponding to the user identity from a preset acoustic model library may include determining, based on a user identity of the target user, a first target acoustic model from a preset acoustic model library. Timbre characteristics of the first target acoustic model match preset timbre characteristics of the target user.

C18: The apparatus for data processing may be further configured to execute, by the one or more processors, instructions from the one or more programs for: modifying the first target acoustic model based on the current timbre characteristics of the target user to obtain a modified first target acoustic model, the modified timbre characteristics of the first target acoustic model matching the current timbre characteristics of the target user; and converting the source language speech into a target language speech based on the target acoustic model, including converting the source language speech to a target language speech based on the modified first target acoustic model.

C19: Determining a target acoustic model corresponding to the user identity from a preset acoustic model library may include: determining timbre preferences of the target user based on a user identity of the target user; and determining, based on the timbre preferences, a second target acoustic model from the preset acoustic model library. Timbre characteristics of the second target acoustic model match the timbre preferences of the target user.

C20: The apparatus for data processing may be further configured to execute, by the one or more processors, the one or more programs to include instructions for: collecting user's voice data; classifying the collected voice data based on the voiceprint characteristics to obtain the voice data sets corresponding to the voiceprint characteristics of different users; using the voice data in the voice data set as a training sample to obtain an acoustic model corresponding to each voiceprint characteristic by training, the acoustic model corresponding to different voiceprint characteristics including different timbre characteristics; and establishing the preset acoustic model library based on the acoustic model corresponding to each voiceprint characteristic.

C21: The apparatus for data processing may be further configured to execute, by the one or more processors, the one or more programs to include instructions for: saving a source language speech input by the target user to update a voice data set corresponding to the voiceprint characteristics of the target user; and optimizing the acoustic model corresponding to the voiceprint characteristics of the target user based on the updated voice data set corresponding to the voiceprint characteristics of the target user.

According to certain embodiments of the present disclosure, a non-transitory machine-readable storage medium, D22, is disclosed. The machine-readable medium, D22 stores instructions that, when being executed by one or more processors, cause the data processing device to perform a data processing method as described in one or more of A1 to A7.

Other embodiments of the present disclosure will be apparent to those skilled in the art. The present disclosure is intended to cover any variations, uses, or adaptations of the present disclosure, which are in accordance with the general principles of the present disclosure and include common general knowledge or common technical means in the art that are not disclosed in the present disclosure. The specification and examples are to be considered as illustrative only, and the true scope and spirit of the present disclosure are indicated in the appended claims.

It is to be understood that the present disclosure is not limited to the details of the foregoing described accurate structures shown in the drawings. The scope of the present disclosure is limited only by the appended claims.

The above are only the preferred embodiments of the present disclosure, and are not intended to limit the present disclosure. Any modifications, equivalents, improvements, etc., which are within the spirit and scope of the present disclosure, should be included within the protected scope of the present disclosure.

The above is a detailed description of a data processing method, a data processing device and a device for data processing provided by the present disclosure. The principles and embodiments of the present disclosure are described in the following by using specific examples. The description of the above embodiments is only for helping to understand the method and the core idea of the present disclosure; at the same time, for those skilled in the art, based on the idea of the present disclosure, can make some changes to the specific embodiments and application scopes. In summary, the content of the specification should not be construed as limiting the present disclosure.

What is claimed is:

1. A data processing method, comprising:
   receiving source language speech input by a target user;
   determining, based on the source language speech, a target acoustic model from an acoustic model library, including:
      performing voiceprint recognition to the source language speech input by the target user and determining one or more voiceprint characteristics corresponding to the source language speech;
      determining, based on the one or more voiceprint characteristics corresponding to the source language speech, a target user identity of the target user;
      determining whether an acoustic model corresponding to the target user identity is established in the acoustic model library, wherein the acoustic model library includes at least two acoustic models corresponding to different user identities, each user identity has a correspondence relationship with an acoustic model in the acoustic model library, and the at least two acoustic models corresponding to different user identities have different timbre characteristics;
      when the acoustic model corresponding to the target user identity is established in the acoustic model library, determining the acoustic model corresponding to the target user identity as the target acoustic model; and
      when the acoustic model corresponding to the target user identity is not established in the acoustic model library, providing a default acoustic model having default timbre characteristics as the target acoustic model;
   converting the source language speech into a target language speech based on the target acoustic model;
   outputting the target language speech;
   wherein the method further comprises when the acoustic model corresponding to the target user identity is not established, establishing the acoustic model corresponding to the target user identity without user perception, comprising:
      continuously collecting and accumulating voice data of the target user in a process of translating the source language speech input of the target user using the default acoustic model; and
      upon determining that the accumulated voice data of the target user reaches a preset extent, establishing the acoustic model corresponding to the target user identity by using the accumulated voice data of the target user as training samples to train the acoustic model corresponding to the target user.

2. The method according to claim 1, wherein determining the target acoustic model corresponding to the target user identity from an acoustic model library comprises:
   determining, based on the target user identity of the target user, a first target acoustic model from the acoustic model library, one or more timbre characteristics of the first target acoustic model matching preset timbre characteristics of the target user.

3. The method according to claim 2, further comprising:
   after the determining the first target acoustic model from the acoustic model library,
   modifying, based on one or more current timbre characteristics of the target user, the first target acoustic model, to obtain a modified first target acoustic model, one or more timbre characteristics of the modified first target acoustic model matching the one or more current timbre characteristics of the target user; and converting, based on the target acoustic model, the source language speech into a target language speech, including:

converting, based on the modified first target acoustic model, the source language speech into a target language speech.

4. The method according to claim 1, wherein determining the target acoustic model corresponding to the target user identity from the acoustic model library comprises:

determining one or more timbre preferences of the target user based on the target user identity of the target user; and determining, based on the one or more timbre preferences, a second target acoustic model from the acoustic model library, one or more timbre characteristics of the second target acoustic model matching the one or more timbre preferences of the target user, wherein the one or more timbre characteristics of the second target acoustic model is different from timbre characteristics of the target user.

5. The method according to claim 4, wherein: the second target acoustic model corresponds to a voice of a celebrity or a cartoon character preset by the target user.

6. The method according to claim 1, further comprising:

collecting user voice data;

classifying the collected voice data based on one or more voiceprint characteristics to obtain one or more voice data sets corresponding to one or more voiceprint characteristics of different users;

using the voice data in the one or more voice data sets as training samples to obtain an acoustic model corresponding to each voiceprint characteristic by training, wherein acoustic models corresponding to different voiceprint characteristics include different timbre characteristics; and establishing the acoustic model library based on the acoustic model corresponding to each voiceprint characteristic.

7. The method according to claim 6, further comprising:

saving a source language speech input by the target user to update a voice data set corresponding to the one or more voiceprint characteristics of the target user; and optimizing the acoustic model corresponding to the one or more voiceprint characteristics of the target user based on the updated voice data set corresponding to the one or more voiceprint characteristics of the target user.

8. An apparatus for data processing, comprising: a memory and one or more processors coupled to the memory, wherein the one or more processors are configured to perform:

receiving source language speech input by a target user;

determining, based on the source language speech, a target acoustic model from an acoustic model library, including:

performing voiceprint recognition to the source language speech input by the target user and determining one or more voiceprint characteristics corresponding to the source language speech;

determining, based on the one or more voiceprint characteristics corresponding to the source language speech, a target user identity of the target user;

determining whether an acoustic model corresponding to the target user identity is established in the acoustic model library, wherein the acoustic model library includes at least two acoustic models corresponding to different user identities, each user identity has a correspondence relationship with an acoustic model in the acoustic model library, and the at least two acoustic models corresponding to different user identities have different timbre characteristics;

when the acoustic model corresponding to the target user identity is established in the acoustic model library, determining the acoustic model corresponding to the target user identity as the target acoustic model; and when the acoustic model corresponding to the target user identity is not established in the acoustic model library, providing a default acoustic model having default timbre characteristics as the target acoustic model;

converting the source language speech into a target language speech based on the target acoustic model;

outputting the target language speech;

wherein the one or more processors are further configured to perform: when the acoustic model corresponding to the target user identity is not established, establishing the acoustic model corresponding to the target user identity without user perception, comprising:

continuously collecting and accumulating voice data of the target user in a process of translating the source language speech input of the target user using the default acoustic model; and upon determining that the accumulated voice data of the target user reaches a preset extent, establishing the acoustic model corresponding to the target user identity by using the accumulated voice data of the target user as training samples to train the acoustic model corresponding to the target user.

9. The apparatus according to claim 8, wherein determining the target acoustic model corresponding to the target user identity from the acoustic model library comprises:

determining, based on the target user identity of the target user, a first target acoustic model from the acoustic model library, one or more timbre characteristics of the first target acoustic model matching preset timbre characteristics of the target user.

10. The apparatus according to claim 9, wherein the one or more processors are further configured to perform:

modifying the first target acoustic model based on one or more current timbre characteristics of the target user to obtain a modified first target acoustic model, one or more timbre characteristics of the modified first target acoustic model matching the one or more current timbre characteristics of the target user;

converting, based on the target acoustic model, the source language speech into a target language speech, including:

converting, based on the modified first target acoustic model, the source language speech into a target language speech.

11. The apparatus according to claim 8, wherein determining the target acoustic model corresponding to the target user identity from the acoustic model library comprises:

determining, based on the target user identity of the target user, one or more timbre preferences of the target user; and determining, based on the one or more timbre preferences, a second target acoustic model from the acoustic model library, one or more timbre characteristics of the second target acoustic model matching the one or more timbre preferences of the target user, wherein the one or more timbre characteristics of the second target acoustic model is different from timbre characteristics of the target user.

12. The apparatus according to claim 8, wherein the one or more processors are further configured to perform:
    collecting user voice data;
    classifying the collected voice data based on the one or more voiceprint characteristics to obtain voice data sets corresponding to the one or more voiceprint characteristics of different users;
    using the voice data in the one or more voice data sets as training samples to obtain an acoustic model corresponding to each voiceprint characteristic by training, wherein acoustic models corresponding to different voiceprint characteristics include different timbre characteristics; and
    establishing the acoustic model library based on the acoustic model corresponding to each voiceprint characteristic.

13. The apparatus according to claim 12, wherein the one or more processors are further configured to perform:
    saving a source language speech input by the target user to update the voice data set corresponding to the one or more voiceprint characteristics of the target user; and
    optimizing the acoustic model corresponding to the one or more voiceprint characteristics of the target user based on the updated voice data set corresponding to the one or more voiceprint characteristics of the target user.

14. A non-transitory machine-readable medium storing instructions that, when being executed by one or more processors of a data processing device, cause the one or more processors to perform:
    receiving source language speech input by the target user;
    determining, based on the source language speech, a target acoustic model from an acoustic model library, including:
        performing voiceprint recognition to the source language speech input by the target user and determining one or more voiceprint characteristics corresponding to the source language speech;
        determining, based on the one or more voiceprint characteristics corresponding to the source language speech, a target user identity of the target user;
        determining whether an acoustic model corresponding to the target user identity is established in the acoustic model library, wherein the acoustic model library includes at least two acoustic models corresponding to different user identities, each user identity has a correspondence relationship with an acoustic model in the acoustic model library, and the at least two acoustic models corresponding to different user identities have different timbre characteristics;
        when the acoustic model corresponding to the target user identity is established in the acoustic model library, determining the acoustic model corresponding to the target user identity as the target acoustic model; and
        when the acoustic model corresponding to the target user identity is not established in the acoustic model library, providing a default acoustic model having default timbre characteristics as the target acoustic model;
    converting the source language speech into a target language speech based on the target acoustic model;
    outputting the target language speech;

wherein the instructions further cause one or more processor to perform: when the acoustic model corresponding to the target user identity is not established, establishing the acoustic model corresponding to the target user identity without user perception, comprising:
        continuously collecting and accumulating voice data of the target user in a process of translating the source language speech input of the target user using the default acoustic model; and
        upon determining that the accumulated voice data of the target user reaches a preset extent, establishing the acoustic model corresponding to the target user identity by using the accumulated voice data of the target user as training samples to train the acoustic model corresponding to the target user.

15. The storage medium according to claim 14, wherein determining the target acoustic model corresponding to the target user identity from the acoustic model library comprises:
    determining, based on the target user identity of the target user, a first target acoustic model from the acoustic model library, one or more timbre characteristics of the first target acoustic model matching preset timbre characteristics of the target user.

16. The storage medium according to claim 15, wherein the instructions further cause the one or more processors to perform:
    modifying the first target acoustic model based on one or more current timbre characteristics of the target user to obtain a modified first target acoustic model, one or more timbre characteristics of the modified first target acoustic model matching the one or more current timbre characteristics of the target user;
    converting, based on the target acoustic model, the source language speech into a target language speech, including:
    converting, based on the modified first target acoustic model, the source language speech into a target language speech.

17. The storage medium according to claim 14, wherein determining the target acoustic model corresponding to the target user identity from the acoustic model library comprises:
    determining, based on the target user identity of the target user, one or more timbre preferences of the target user; and
    determining, based on the one or more timbre preferences, a second target acoustic model from the acoustic model library, one or more timbre characteristics of the second target acoustic model matching the one or more timbre preferences of the target user, wherein the one or more timbre characteristics of the second target acoustic model is different from timbre characteristics of the target user.

18. The storage medium according to claim 14, wherein the instructions further cause the one or more processors to perform:
    collecting user voice data;
    classifying the collected voice data based on the one or more voiceprint characteristics to obtain voice data sets corresponding to the one or more voiceprint characteristics of different users;
    using the voice data in the one or more voice data sets as training samples to obtain an acoustic model corresponding to each voiceprint characteristic by training, wherein acoustic models corresponding to different voiceprint characteristics include different timbre characteristics; and establishing the acoustic model library based on the acoustic model corresponding to each voiceprint characteristic.

* * * * *